United States Patent Office 2,728,635
Patented Dec. 27, 1955

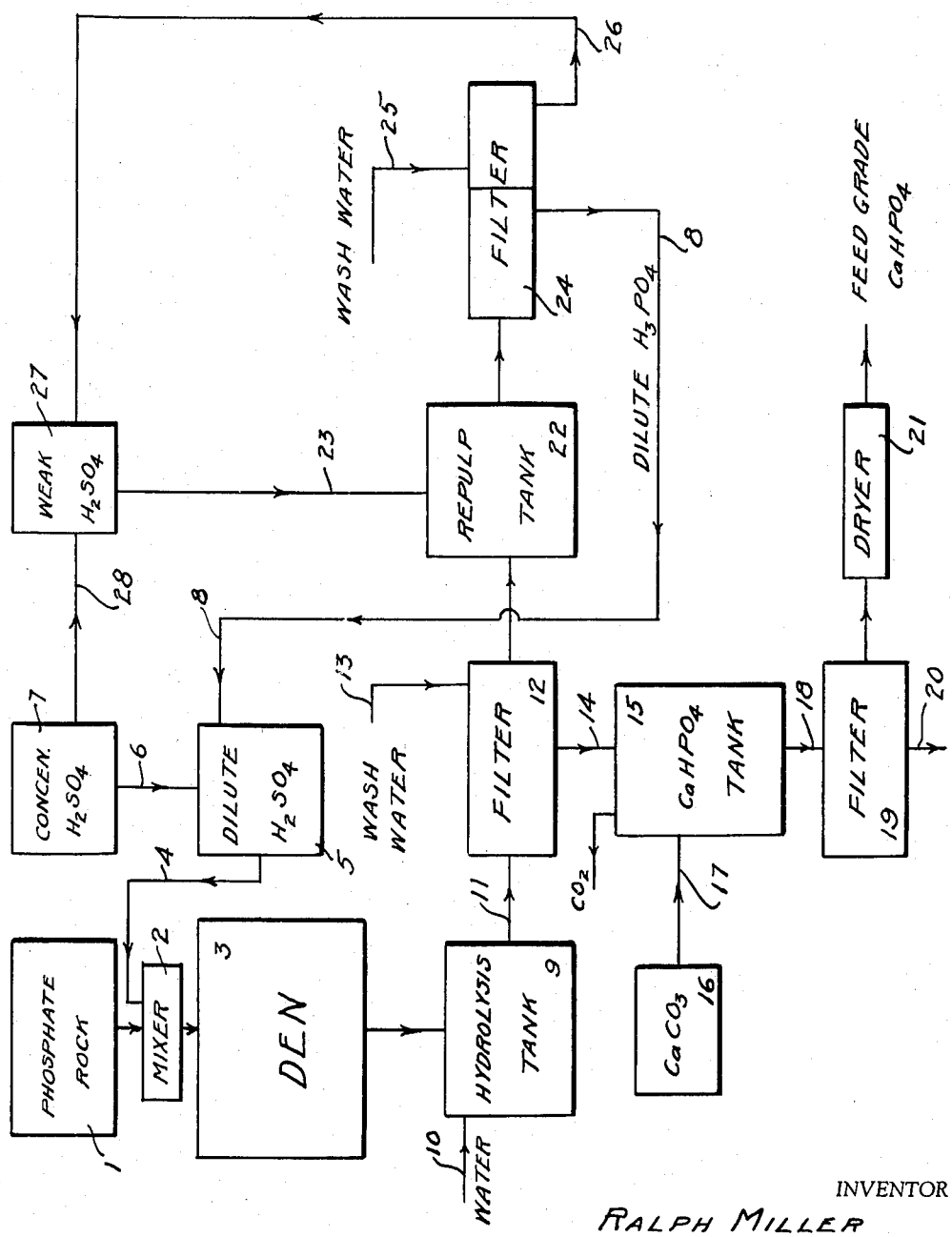

2,728,635

PRODUCTION OF FEED GRADE DICALCIUM PHOSPHATE

Ralph Miller, Pleasantville, N. Y., assignor to The Chemical Foundation, Incorporated, a New York membership corporation Application July 16, 1951, Serial No. 236,886

4 Claims. (Cl. 23—109)

This invention is concerned with the production of dicalcium phosphate and more particularly with the production of dicalcium phosphate of relatively low fluorine content particularly suitable as feed grade phosphate.

This invention stems from additional work on the process described in the patent application Serial No. 4,887 filed January 28, 1948, now U. S. Patent No. 2,567,227 issued September 11, 1951, of which this is a continuation-in-part.

It is known that adequate animal nutrition requires a minimum content of available calcium and phosphorus in the diet. If specific provision is not made to include these minerals in the feed, experience has shown that very often livestock suffers because of a deficiency of these nutrients. For this reason it is necessary to add mineral supplements to feedstuffs to be certain that these essential nutrients are present in at least minimal amounts. The need for phosphorus supplements is materially greater than the available supply of bone meal. This has resulted in the production from phosphate rock of feed grade phosphate.

Since phosphate rock usually contains a relatively large amount of fluorine and fluorine is a toxic substance when present in the diet to more than a very limited extent, it is essential that phosphates for feed use made from phosphate rock contain not more than a specified maximum amount of fluorine. The specifications for feed grade phosphates at the present time requires that ratio of phosphorus to fluorine be not less than 40 to 1. If the ratio is expressed in terms of $P_2O_5$ to fluorine, the ratio of $P_2O_5$ to F should not be less than 91.6 to 1.

Most commercial phosphate rock contains between 30 and 35% of $P_2O_5$ and between 3% and 4.2% fluorine. To meet the specifications mentioned above available phosphates must be made containing less than 10% of the fluorine usually associated with the phosphorus in phosphate rock. A variety of methods are available for accomplishing this objective and many of them are in use. In view of the large difference between the cost of phosphorus in the form of phosphate fertilizer and phosphorus in the form of feed grade phosphorus, it can be concluded that the cost of fluorine removal is appreciable.

In my patent application Serial No. 4,887 referred to above, a cyclic method is described for producing dicalcium phosphate from phosphate rock in which monocalcium phosphate is formed as an intermediate compound. The monocalcium phosphate is hydrolyzed to form solid dicalcium phosphate and a solution of phosphoric acid containing some dissolved lime. It has been discovered that when crude fluorine-containing monocalcium phosphate is hydrolyzed to form solid dicalcium phosphate and a solution of phosphoric acid containing dissolved lime, the solid dicalcium phosphate retains most of the fluorine that was present in the initial crude fluorine-containing monocalcium phosphate. As a result of this happening, the ratio of $P_2O_5$ to F in the hydrolysis solution is considerably in excess of the minimum ratio specified for the production of feed grade phosphates. The hydrolysis solution is then used to produce feed grade phosphates.

In order to fully explain the invention, a flow sheet of the process is shown in the accompanying drawing.

One simple method of producing feed grade dicalcium phosphate comprehended under this invention, consists of intially forming crude, fluorine-containing monocalcium phosphate. The crude, fluorine-containing monocalcium phosphate is then hydrolyzed with a limited excess of water. The solution formed is separated from the solid residue by any convenient separation method such as filtration or the like. The separated hydrolysis liquid containing a high ratio of $P_2O_5$ to fluorine is treated with such a quantity of a base such as pulverized limestone or hydrated lime that the phosphate contained in the hydrolysis solution is precipitated as dicalcium phosphate. It has been ascertained that at a pH of about 4.5 most of the phosphate in the solution is precipitated as dicalcium phosphate. By always maintaining the solution on the acid side, little or no tricalcium phosphate is formed during the neutralization step.

The solid residue of the hydrolysis operation contains dicalcium phosphate along with a fluorine-containing solid. The elements with which the fluorine is molecularly associated in the crude monocalcium phosphate made in accordance with this process is not precisely known. Similarly, the elements with which the fluorine is molecularly associated in the solid hydrolysis residue is not precisely known.

In one instance using the method of Patent 2,567,227 crude, fluorine-containing monocalcium phosphate was hydrolyzed and the hydrolysis residue separated from the hydrolysis solution. The initial monocalcium phosphate was made from phosphate rock and a low fluorine content phosphoric acid. The initial monocalcium phosphate was made from phosphate rock and a low fluorine content phosphoric acid. The ratio of $P_2O_5$ to fluorine in the monocalcium phosphate was 101 to 1. The ratio of $P_2O_5$ to fluorine in the hydrolysis residue was 12.5 to 1 indicating the retention of the fluorine in the hydrolysis residue.

It has also been discovered that this method of converting crude fluorine containing monocalcium phosphate into products with different $P_2O_5$ to F ratios is operable on crude fluorine-containing monocalcium phosphates made by methods other than the method described in the previous disclosure. One well known method of producing crude fluorine-containing monocalcium phosphate on a large scale is the acidulation of phosphate rock with phosphoric acid. This is the method by which triple superphosphate is made. Most triple superphosphate is made by acidulating high grade phosphate rock with crude phosphoric acid. The resulting product contains between 46 and 49% available $P_2O_5$. The monocalcium phosphate content of such a product is between 81.6% and 87%. The balance is moisture, acid insoluble substances in the phosphate rock, unreacted rock, etc. When such a product is hydrolyzed, the solid dicalcium phosphate formed is mixed with the acid insoluble substances. Although the solid hydrolysis residue contains a smaller $P_2O_5$ concentration than the intial material, it is still sufficiently concentrated so that it can be used as a phosphate fertilizer. The hydrolysis liquid contains a large ratio of $P_2O_5$ to F and by treatment with limestone or the lime feed grade dicalcium phosphate is made.

The efficacy of this method for the described purpose will be appreciated from a consideration of actual tests which have been made. In one such test a typical crude sample of triple superphosphate containing 46% a. p. a. was hydrolyzed with warm water. The resulting slurry was filtered. Sufficient hydrated lime was added to the filtrate to bring the pH to 4.5. The precipitate that formed was filtered off, dried and analyzed. The $P_2O_5$ content was 38.46%; the fluorine content was .09%. The $P_2O_5$ to fluorine ratio being 427 to 1, the product was an excellent feed grade phosphate supplement.

Ordinary superphosphate is made by treating ground phosphate rock with moderately concentrated sulfuric acid. The resulting mixture is essentially a mixture of crude, fluorine-containing monocalcium phosphate and calcium sulfate. It has been found that such a mixture is also suitable for producing a feed grade product with a high $P_2O_5$ fluorine ratio. The operation is similar to that previously described. The solid is treated with an excess of water to cause the monocalcium phosphate to hydrolyze. Part of the monocalcium phosphate is converted to solid dicalcium phosphate and phosphoric acid and part of it dissolves in the resultant solution. Most of the fluorine present in the initial superphosphate is retained by the solid hydrolysis residue. In addition to dicalcium phosphate and the acid insoluble constituents of the rock the hydrolysis residue also contains all of the calcium sulfate so that the $P_2O_5$ concentration of the dried hydrolysis residue is quite low. In some instances it will be so low that it cannot be readily marketed in the fertilizer field.

In one experiment ordinary superphosphate was treated with an excess of hot water. The resulting slurry was filtered and the filter cake washed. The filtrate was treated with sufficient hydrated lime to precipitate most of the phosphate in the filtrate as dicalcium phosphate. The dicalcium phosphate was dewatered on a filter. Both filter cakes and the original superphosphate were dried in an oven and analyzed for $P_2O_5$ and fluorine. The results were:

| Sample | Percent $P_2O_5$ | Percent F | $\dfrac{\text{Percent } P_2O_5}{\text{Percent F}}$ |
| --- | --- | --- | --- |
| Original superphosphate | 22.54 | .85 | 26.5 |
| Hydrolysis residue | 9.84 | 1.42 | 6.93 |
| Precipitated $CaHPO_4$ | 41.36 | .06 | 6.86 |

The percentage of the initial $P_2O_5$ that is contained in the solid hydrolysis residue varies from about 15 to 35%. This amount of $P_2O_5$ is too large to permit it to be wasted. Its saleability as mentioned above, depends in part on its concentration. If the concentration is too low it is necessary to up-grade or recover this $P_2O_5$. One method involves treating the solid hydrolysis residue with sulfuric acid to solubilize the $P_2O_5$ present. Enough sulfuric acid is added to the residue to dissolve substantially all of the phosphate using relatively dilute sulfuric acid. The phosphate solution is separated from the insoluble calcium sulfate using sufficient wash water to minimize the loss of $P_2O_5$ values in the filter cake. The resultant dilute phosphoric acid solution is used to dilute the concentrated sulfuric acid prior to the acidulation of the rock. By proceeding in this manner substantially all the $P_2O_5$ contained in the initial phosphate rock is converted to feed grade material. This method of treating ordinary superphosphate is especially useful when contact sulfuric acid is used to treat the rock. Contact sulfuric acid is produced at a concentration of 98%. In acidulating phosphate rock sulfuric acid of 64 to 68% concentration is normally used. Therefore, the contact acid must be diluted with water before the acid is mixed with the rock. This water can be used to aid in recovering the $P_2O_5$ contained in the hydrolysis residue.

The attached flow sheet illustrates one method by which the process can be carried out. Ground phosphate rock from supply silo 1 is mixed with properly diluted sulfuric acid containing some phosphoric acid in mixer 2 and the mixed mass is discharged into the den 3. The sulfuric acid enters the mixer through line 4 which is connected to tank 5. Tank 5 is supplied by line 6 through which the concentrated sulfuric acid contained in tank 7 flows and by line 8 through which a dilute phosphoric acid solution enters. In the den the rock and acid react for a period of about 24 hours to form a fluorine-containing mass composed primarily of calcium sulfate and monocalcium phosphate. The superphosphate formed in the den is ground in any suitable manner and conveyed to hydrolysis tank 9 in which it is intimately contacted with a limited excess of water entering from line 10. The resulting slurry flows through line 11 to filter 12. The hydrolysis residue is separated from the hydrolysis solution by means of the filter. The residue is washed with wash water entering through line 13 to recover substantially all of the soluble $P_2O_5$ present in the hydrolysis solution. The hydrolysis solution flows through line 14 into tank 15. Finely divided limestone or other suitable lime base is fed to the tank 15 through line 17 and in an amount sufficient to adjust the pH to between about 4 and 5 and preferably to 4.5. The tank 15 preferably is fitted with stirring devices to insure rapid and intimate mixing of the base and solution. The addition of the base under these conditions precipitates feed grade dicalcium phosphate and liberates carbon dioxide. The slurry formed in tank 15 is passed through line 18 to filter 19. In the filter the slurry is dewatered, waste water being discharged through line 20. The dewatered solids are conveyed to the dryer 21 and withdrawn for bagging or to storage.

The hydrolysis residue separated on filter 12 contains sufficient $P_2O_5$ to warrant its recovery. This is accomplished by repulping the hydrolysis residue in tank 22 with sufficient weak sulfuric acid supplied through line 23 to dissolve the dicalcium phosphate precipitated in the hydrolysis step. The resultant slurry is passed to filter 24. The filtrate essentially is a dilute phosphoric acid solution and is passed through line 8 to acid makeup tank 5. The residue is washed on the filter with wash water entering from line 25. The wash liquor is kept separate from the initial filtrate. The wash liquor flows from filter 24 through line 26 to tank 27. In tank 27 the wash liquor is fortified with strong sulfuric acid fed from tank 7 through line 28. The weak sulfuric acid formed in tank 27 is used to dissolve the phosphate in repulp tank 22. If excess wash water is needed to thoroughly remove the soluble $P_2O_5$ on filter 24 it is used. The resultant excess wash liquor may be passed to line 10 and used in the hydrolysis step.

One potential advantage of this process is that it permits all of the phosphate in the final product to go into solution. It has been found that the very small amount of uranium contained in the phosphate rock can be recovered if the phosphate is put into solution. Since the production of ordinary superphosphate never permits the phosphate to dissolve, the uranium contained in the phosphate rock used to make ordinary phosphate consequently never can be recovered. By using the process of this invention at the expense of some limestone and sulfuric acid, this uranium becomes potentially available.

It is known that monocalcium phosphate is hydrolyzed by water into solid dicalcium phosphate and a hydrolysis solution. The precent conversion of monocalcium phosphate to dicalcium phosphate varies with the ratio of weight of water to weight of monocalcium phosphate and with the temperature at which the conversion is carried out. Since the primary purpose of this invention is to fractionate crude fluorine-containing monocalcium phosphate so as to concentrate most of the fluorine in the hydrolysis residue and since this result is accomplished over a wide temperature range the ratio of water to monocalcium phosphate is not critical providing a limited excess of water is employed. A suitable ratio of water to monocalcium phosphate is anything in the neighborhood of 4 to 10 to 1. These figures are not limits since the reaction takes place outside these limits. With a given ratio of water to monocalcium phosphate the higher the temperature the greater the formation of dicalcium phosphate but the easier to secure intimate contact of the solid with the solution. In addition, hot slurries filter more rapidly than cool ones. For this reason the conditions selected will vary with the facilities available and concentration of monocalcium phosphate contained in the material fed to the hydrolysis step.

While preferred embodiments of the invention have been described, it is to be understood that these are given didactically to explain the underlying principles involved and not as limiting the invention except as such limitations are imposed by the appended claims.

I claim:

1. A method of producing feed grade dicalcium phosphate which comprises acidulating a fluorine-containing phosphate rock with a mixture of sulfuric and phosphoric acids to form superphosphate, hydrolyzing the superphosphate with a limited excess of water to form a hydrolysis product comprising a fluorine-containing solid and dicalcium phosphate and a phosphate-containing solution, the ratio of $P_2O_5$ to F in said hydrolysis product being less than in the phosphate rock, separating the hydrolysis product from the solution, raising the pH of said separated solution to between about 4 and 5 by adding a lime base to the separated solution to precipitate a feed grade dicalcium phosphate; repulping the solid residue formed in the hydrolysis operation with dilute sulfuric acid to dissolve the dicalcium phosphate content, separating the solution from undissolved solids, admixing the separated solution with sulfuric acid for use in the initial acidulation of phosphate rock; washing the said undissolved solids and utilizing the wash water as a diluent for concentrated sulfuric acid to form the dilute acid for repulping the hydrolysis residue.

2. A method of producing feed grade dicalcium phosphate from phosphate rock which comprises acidulating phosphate rock with phosphoric acid to form triple superphosphate, hydrolyzing the triple superphosphate with a limited excess of water to form a hydrolysis product comprising a fluorine-containing solid and dicalcium phosphate and a phosphate-containing solution, the ratio of $P_2O_5$ to F in the hydrolysis product being less than in the triple superphosphate and in which solution the ratio of $P_2O_5$ to F is greater than such ratio in the triple superphosphate; separating the solid from the solution, raising the pH of the separated solution to between about 4 and 5 by adding a calcium-containing, alkaline-reacting precipitant to the solution thereby to precipitate feed grade dicalcium phosphate, recovering and drying such dicalcium phosphate; repulping the separated hydrolysis residue with sufficient dilute phosphoric acid to dissolve the contained dicalcium phosphate, separating the solution from undissolved solids and recycling the separated solution to the acidulation step.

3. A process in accordance with claim 2 in which the precipitate is chosen from the group consisting of lime, limestone and hydrated lime.

4. A method of producing feed grade dicalcium phosphate which comprises acidulating ground phosphate rock with a makeup acid comprising a dilute mixture of sulfuric and phosphoris acids to form superphosphate, hydrolyzing the superphosphate with hot water to form a slurry of solid fluorine-containing dicalcium phosphate and a lime-containing phosphoric acid solution, the ratio of $P_2O_5$ to F in the dicalcium phosphate being materially less than such ratio in the acidulated phosphate rock and such ratio in the solution being materially greater than such ratio in the superphosphate, filtering the slurry, raising the pH of the separated solution to between about 4 and 5 to percipitate feed grade dicalcium phosphate; contacting the hydrolysis residue with sufficient dilute sulfuric acid to dissolve substantially all the $P_2O_5$ in such solids; filtering the resulting slurry, recycling the filtrate for use in the make up acid; washing the undissolved residue with water and admixing the wash water with concentrated sulfuric acid to form the dilute acid employed for treating the solids formed in the hydrolysis steps.

References Cited in the file of this patent

UNITED STATES PATENTS

| | | |
|---|---|---|
| 1,235,025 | Glaeser | July 31, 1917 |
| 1,459,124 | Webster | June 19, 1923 |
| 1,487,205 | Carothers et al. | Mar. 18, 1924 |
| 2,013,970 | Moore | Sept. 10, 1935 |
| 2,021,527 | Suchy | Nov. 19, 1935 |
| 2,043,238 | Curtis | June 9, 1936 |
| 2,164,627 | Seyfried | July 4, 1939 |
| 2,176,464 | Merchant | Oct. 17, 1939 |
| 2,384,814 | Coleman | Sept. 18, 1945 |
| 2,384,856 | Ten Eyck | Sept. 18, 1945 |
| 2,417,462 | Adler | Mar. 18, 1947 |
| 2,567,227 | Miller | Sept. 11, 1951 |